US011643790B2

(12) United States Patent
Renger et al.

(10) Patent No.: US 11,643,790 B2
(45) Date of Patent: May 9, 2023

(54) SUCTION DREDGER HAVING A SWIVELING FILTER UNIT

(71) Applicant: RSP GMBH, Saalfeld (DE)

(72) Inventors: Karl-Heinz Renger, Höhe (DE); Marina Renger, Höhe (DE); Jens Graber, Höhe (DE)

(73) Assignee: RSP GMBH, Saalfeld (DE)

( * ) Notice: Subject to any disclaimer, the term of this patent is extended or adjusted under 35 U.S.C. 154(b) by 889 days.

(21) Appl. No.: 16/500,186

(22) PCT Filed: Apr. 5, 2018

(86) PCT No.: PCT/EP2018/058755
§ 371 (c)(1),
(2) Date: Oct. 2, 2019

(87) PCT Pub. No.: WO2018/197178
PCT Pub. Date: Nov. 1, 2018

(65) Prior Publication Data
US 2020/0123736 A1    Apr. 23, 2020

(30) Foreign Application Priority Data

Apr. 24, 2017    (DE) ..................... 10 2017 108 731.1

(51) Int. Cl.
*E02F 3/92*    (2006.01)
*E02F 3/88*    (2006.01)
(Continued)

(52) U.S. Cl.
CPC ............ *E02F 3/8825* (2013.01); *B60P 1/165* (2013.01); *E02F 3/9243* (2013.01); *E02F 7/06* (2013.01)

(58) Field of Classification Search
CPC ......... E02F 3/8825; E02F 3/9243; E02F 7/06; E02F 3/8816; E02F 3/00; E02F 3/04;
(Continued)

(56) References Cited

U.S. PATENT DOCUMENTS 2,747,216 A * 5/1956 Tschudy ................ A47L 9/1427
55/374
3,842,461 A * 10/1974 Wurster .................... E03F 7/10
55/467
(Continued)

FOREIGN PATENT DOCUMENTS

DE         9016448     2/1991
DE       202010007463  11/2010
(Continued)

*Primary Examiner* — Edwin J Toledo-Duran
(74) *Attorney, Agent, or Firm* — Mayer & Williams, PC; Stuart Mayer

(57) ABSTRACT

The invention relates to a suction excavator having a vehicle chassis, a suction fan, and a dumpable material collection container. The material collection container has a collection chamber and is swivelable about a tilt axis that extends parallel to the vehicle longitudinal axis, between a working position and an emptying position. Furthermore, a filter unit is provided which is situated in a filter chamber in the material collection container and through which suction flow passes. The filter unit is rotatably mounted on a rotational axis that extends parallel to the tilt axis of the material collection container, wherein in an unlocked state, swiveling of the filter unit about the rotational axis is enabled in order to swivel the filter unit out of the filter chamber, at least in sections.

10 Claims, 2 Drawing Sheets

(51) Int. Cl.
*B60P 1/16* (2006.01)
*E02F 7/06* (2006.01)

(58) Field of Classification Search
CPC .... E02F 3/88; E02F 3/92; B60P 1/165; B01D 45/06; B01D 46/0002; B01D 46/02; B01D 46/58; B01D 46/71; B01D 50/20; B01D 45/00; B01D 46/00; B01D 2273/28; Y10S 37/905
See application file for complete search history.

(56) References Cited

U.S. PATENT DOCUMENTS

| | | | | |
|---|---|---|---|---|
| 3,930,324 A * | 1/1976 | Wightman | ............ | E02F 3/8825 37/189 |
| 5,016,717 A * | 5/1991 | Simons | ................ | E21B 21/063 405/249 |
| 5,425,188 A * | 6/1995 | Rinker | ............... | B01D 46/0002 175/206 |
| 5,487,229 A * | 1/1996 | Nathenson | ................ | E02F 3/94 406/171 |
| 5,709,270 A * | 1/1998 | Theurer | .................. | E01B 27/04 104/2 |
| 5,791,073 A * | 8/1998 | Palmer | .................... | E02F 5/003 406/173 |
| 5,860,232 A * | 1/1999 | Nathenson | .............. | E02F 5/003 175/215 |
| 5,971,084 A * | 10/1999 | Dietzen | ................ | E21B 41/005 175/207 |
| 6,079,130 A * | 6/2000 | Freeman | .................. | C22B 3/02 417/900 |
| 6,202,330 B1 * | 3/2001 | Bolton | .................. | B01D 50/20 37/195 |
| 6,216,800 B1 * | 4/2001 | Wilson | .................. | E21B 21/065 173/4 |
| 6,385,867 B1 * | 5/2002 | Slabach | ............... | E02F 3/8816 37/304 |
| 6,604,304 B1 * | 8/2003 | Slabach | ............... | E02F 3/8816 37/304 |
| 6,637,522 B2 * | 10/2003 | Wilson | .................... | E21B 44/02 175/48 |
| 6,857,837 B2 * | 2/2005 | Rajewski | .............. | E02F 3/8816 414/23 |
| 7,076,895 B2 * | 7/2006 | Haugen | ..................... | E02F 7/02 104/2 |
| 7,503,134 B2 * | 3/2009 | Buckner | ................ | E03F 9/002 15/352 |
| 8,459,750 B2 * | 6/2013 | Antoline | ............... | E21B 15/006 299/64 |
| 10,119,245 B2 * | 11/2018 | Buchleiter | ............ | E02F 5/003 |
| 10,246,851 B2 * | 4/2019 | Rajewski | .................. | E02F 3/90 |
| 10,337,167 B2 * | 7/2019 | Maybury, Jr. | .......... | E02F 5/003 |
| 10,443,210 B2 * | 10/2019 | Maybury, Jr. | .......... | E02F 5/226 |
| 10,640,938 B2 * | 5/2020 | Renger | ................ | E01H 1/0809 |
| 11,179,754 B2 * | 11/2021 | Doucette, Jr. | ............ | B08B 9/0808 |
| 11,285,512 B2 * | 3/2022 | Barnett | .................. | B07B 13/10 |
| 11,499,290 B2 * | 11/2022 | Strobel | .................... | B04C 5/14 |
| 2019/0127950 A1 * | 5/2019 | Renger | ..................... | E02F 3/94 |

FOREIGN PATENT DOCUMENTS

| | | |
|---|---|---|
| DE | 102012009576 | 11/2013 |
| DE | 202016005074 | 9/2016 |
| EP | 2896748 | 7/2015 |
| JP | 2004270160 | 9/2004 |

* cited by examiner

SUCTION DREDGER HAVING A SWIVELING FILTER UNIT

BACKGROUND OF THE INVENTION

The present invention relates to a suction excavator having a filter unit. Such suction excavators have a vehicle chassis, a suction fan that generates a suction flow, a dumpable material collection container that has a collection chamber and is swivelable about a tilt axis that extends parallel to the vehicle longitudinal axis, between a working position and an emptying position, in which a collection chamber opening is in a lower position in order to evacuate by gravity the material contained in the collection chamber. The filter unit is situated in a filter chamber in the material collection container, behind the collection chamber in the suction flow direction, and usually contains multiple filter elements through which the suction flow passes. A suction connection opens into the collection chamber, for example at the rear end-face wall of the material collection container. The single suction flow duct leads from the suction connection, through the collection chamber and the filter unit, to the suction fan and from there to an outlet.

A suction excavator is a vehicle having a vehicle chassis with a vehicle longitudinal axis that extends in a vehicle center plane. A dumpable material collection container that is suspended on a tilt axis extending in parallel to the vehicle longitudinal axis is typically used. In conjunction with utility vehicles and trucks, it is known to provide superstructures on a so-called vehicle chassis that are necessary for the particular intended purpose, and which are adapted to a greater or lesser extent to the mobile application. Such superstructures are connected to the vehicle chassis; in certain applications the vehicle main drive is also utilized as a drive unit for auxiliary functions.

A suction excavator is known from DE 38 37 670 A1, including a pneumatic suction nozzle, a collection container for the suctioned-in soil, into which the suction nozzle opens and in which the soil is separated from the suction air flow, and a suction fan, connected to the collection container, for generating the suction air flow. Further customary components of the suction excavator include guide elements for the suction nozzle, and filters for cleaning the suction air before it leaves the collection container and is released to the surroundings.

DE 10 2011 119 924 A1 discloses a suction excavator for receiving suction material, such as soil or sludge, having a pneumatic suction turbine, for generating a suction air flow, that is connected to a collection container into which a suction hose opens. The suction hose is situated on a guide arm, which is fastened to a vertical rotational axis in order to expand the working range of the suction excavator. Two suction hose connections are provided on the material collection container, each of which opens into the collection container at the outer side area of a rear end-face wall.

DE 198 51 111 C1 describes a suction excavator, having a collection chamber with a filter situated in the front of the material collection container in the travel direction and in the rear of the material collection container in the travel direction. The connection of the suction tube to the material collection container takes place on one side of the rear end of the collection container.

A suction excavator is also described in EP 1 151 165 B1. This suction excavator operates according to the thin stream conveying principle, and is configured primarily for receiving excavated soil. The filter unit is situated in front of the collection chamber in the travel direction, and suction flow passes through the filter unit after the coarse material components have been separated in the collection chamber. Provided above the filter unit are compressed air tubes which are able to blow compressed air through the filter in order to clean it. However, the filter unit eventually becomes so heavily soiled that it must be removed and cleaned in order to maintain the desired suction power. This filter cleaning requires a high level of effort, since a crane or a comparable lifting unit is necessary for removing the relatively heavy filter.

A suction excavator having a hydraulic lifting device is described in DE 10 2012 003 226 A1. By extending the lifting device, a cover of a material collection container is swiveled about a cover rotational axis so that the material collection container is opened at the top, at the side.

DE 20 2016 005 074 U1 describes a filter assembly of a suction excavator having multiple filter cartridges that are provided with a flange at least on an end-face side for installation in the filter assembly. The filter assembly is mounted in the suction unit of the suction excavator so as to be swivelable, so that it may be swiveled for replacing the filter cartridges.

DE 90 16 448 U1 discloses a suction excavator having a filter wall. The filter wall is divided into multiple closely adjoining filter lamellae, which for cleaning may preferably be swiveled out of the plane of the filter into an inclined position by means of a drive device. In this way, dust that has deposited on the top side of the filter wall may be brought into the suction material receiving container. Knocking tools which act on the filter wall may be situated in the cover of the receiving container. Alternatively, a compressed air device for filter cleaning may be used.

SUMMARY OF THE INVENTION

The object of the present invention is to provide an improved suction excavator that allows quicker and easier control and cleaning of its filter unit.

This object is achieved by a suction excavator according to appended claim 1.

The suction excavator according to the invention, firstly, typically has a vehicle chassis, which in addition to the customary vehicle components also carries the special superstructures that allow the suction excavator operation. These include a suction fan that generates a suction flow, as well as a tiltable material collection container that has a collection chamber and is swivelable about a tilt axis that extends parallel to the vehicle longitudinal axis, between a working position and an emptying position. The working position is occupied for the suction excavator operation or for traveling. In the emptying position, the material collection container has been swiveled about the tilt axis so that a collection chamber opening is in a lower position in order to dump the material, accommodated in the collection chamber, by gravity. The material collection container also includes a filter unit, in a filter chamber, that is situated in the material collection container behind the collection chamber in the suction flow direction, and that contains at least one filter element through which the suction flow passes. Depending on the conduction of the suction air flow, the filter chamber may be situated in front of or behind the material collection container, based on the travel direction of the suction excavator.

The filter unit is rotatably mounted on a rotational axis that extends parallel to the tilt axis of the material collection container. The rotational axis is radially spaced apart from the tilt axis, preferably diametrically opposite from the tilt axis. The rotational axis is supported on the material collection container. Thus, unlike in previously known applications, the filter unit is not fastened to the cover of the collection container. This allows the entire filter unit to swivel out beyond the vehicle alignment via the rotational axis, so that the swiveled-out filter unit is easily accessible.

In addition, at least one locking element is provided, which in the locked state fixes the position of the filter unit in the filter chamber and blocks rotation of the filter unit about the rotational axis, so that the filter unit remains in the filter chamber, even during dumping (emptying) of the material collection container. When the locking element is unlocked, the filter unit is no longer fixed in the filter chamber, but instead is swivelable about the rotational axis so that it may be swiveled out of the filter chamber. Suitable sealing elements are preferably provided which ensure that the suction air flow is conducted through the filter unit, and that there is no entry or exit of secondary air. For this purpose, it is also particularly preferred that the locking element ensures that the filter unit in the locked state is situated in the filter chamber with appropriate sealing.

The center of gravity of the filter unit is situated in relation to the rotational axis in such a way that the filter unit, at least in sections, swivels out of the filter chamber by gravity during the transition from the working position into the emptying position, i.e., during dumping of the material collection container and with the locking element unlocked at the same time.

In one modified embodiment, a slew drive is provided, which upon activation additionally acts on the filter unit in order to assist with the swiveling out from the filter chamber. Embodiments are also possible in which the filter unit in the emptying position, with the locking element unlocked, initially swivels out of the filter chamber for a first portion, driven by gravity, and a slew drive is then used for the further swiveling out.

In the simplest case, the locking element is formed by one or more screws or the like that must be manually loosened. In refined embodiments, automatic locking elements are used which may be electrically or hydraulically actuated, for example. The locking elements also secure the filter unit against shifting due to the negative pressure that prevails in the filter chamber during operation.

The bearing of the filter unit that is modified according to the invention may be incorporated into previously manufactured suction excavators without further changes to the suction principle. Since the filter unit swivels out of the filter chamber during dumping of the material collection container, and with the locking element unlocked, the state of the individual filter elements may be assessed, and if necessary a cleaning, for example using a high-pressure cleaner, may take place, or filter elements may also be replaced. Regular filter cleaning also improves the performance of the suction excavator. The service life of the filter unit is extended by the avoidance or rapid removal of heavy soiling.

According to one preferred embodiment, the filter unit is detachably mounted on the rotational axis, or alternatively the rotational axis is detachably mounted on the material collection container, so that after the connection in question is detached, the entire filter unit may be removed from the filter chamber. If it is necessary to replace one or more filter elements, either the entire filter unit may be removed after four, for example, securing bolts on the rotational axis are removed, or the filter element to be replaced is individually removed from the filter chamber.

One preferred embodiment is characterized in that the rotational axis is situated on the side diametrically opposite from the tilt axis in relation to a vehicle center plane. The rotational axis is preferably supported on the upper edge of the material collection container. It is advantageous when the material collection container is swivelable by more than 90° about the tilt axis in order to reach the emptying position from the working position. During the transition from the working position into the emptying position, the rotational axis of the filter unit together with the material collection container is swiveled about the tilt axis, thereby passing through a plane that is vertical and includes the tilt axis, and in the emptying position of the collection container assumes a position that is outside the projection plane of the chassis of the suction excavator, i.e., on the same side as the tilt axis in relation to the vehicle center plane, but farther away from same.

According to one embodiment, the filter unit has a base plate or retaining plate to which the multiple filter elements are fastened. The retaining plate on one of its side edges is preferably supported on the rotational axis, so that together with the filter unit it may be swiveled about the rotational axis when the locking elements are in the unlocked state.

According to one advantageous embodiment, the suction excavator has a cover which may have a one- or multi-part design, and which in the working position closes the material collection container on its top side. For opening, the cover is preferably supported so as to be swivelable on a folding axis in order to release the top side of the material collection container during the transition into the emptying position, so that the material contained in the collection chamber may be dumped out. Air duct sections for conducting the suction flow from the filter unit to the suction fan are preferably situated in the cover.

One modified embodiment of the material collection container has a cover that has an at least two-part design. Each cover part is rotatably fastened to a folding axis situated in the plane of symmetry of the material collection container, so that in each case approximately one-half of the top side of the material collection container can be opened when it is tilted for emptying. It is advantageous to provide opening, closing, and locking elements for opening the cover, or for closing it tight during the suction operation, so that the pressure conditions in the material collection container meet the requirements of a suction excavator.

One preferred embodiment uses a filter element that is formed by multiple cylindrical filter cartridges made of filter material. The filter cartridges are preferably detachably fastened in the retaining plate by means of quick-acting closures. To allow the filter unit to swivel out of the filter chamber, a clearance remains between the filter cartridges, which are positioned the farthest distance from the rotational axis, and the wall of the filter chamber, which is situated the farthest distance from the rotational axis.

Depending on the embodiment of the material collection container, the collection chamber may be situated in front of or behind the filter unit, based on the travel direction of the suction excavator.

According to one modified embodiment, dumping of the material collection container on both sides of the vehicle is made possible. At the same time, it is advantageous when an elevated position of the tilt axis is provided to allow emptying of the material collection container onto surfaces at different heights, for example an adjacent vehicle.

According to one preferred embodiment, the suction excavator has at least one tilt drive that acts on the material collection container in order to pivot it about the tilt axis for an emptying operation.

BRIEF DESCRIPTION OF THE DRAWINGS

Further particulars, advantages, and refinements of the present invention result from the following description of one preferred embodiment, with reference to the drawings, which show the following.

DETAILED DESCRIPTION OF THE INVENTION

Figure 1:
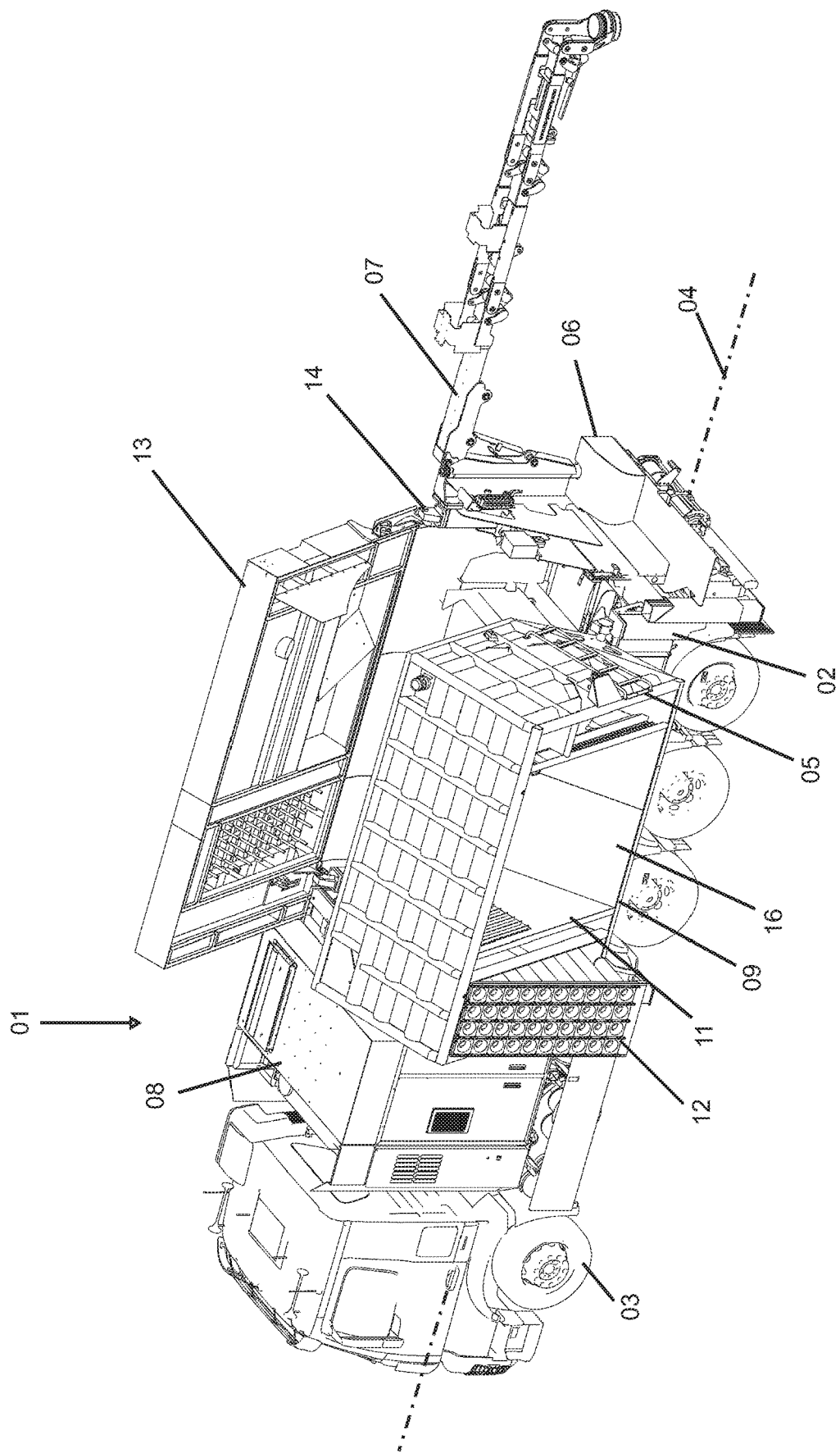
FIG. 1 shows a simplified perspective view of a suction excavator according to the invention, with a material collection container in the emptying position and with the filter unit swiveled out.
Figure 2:
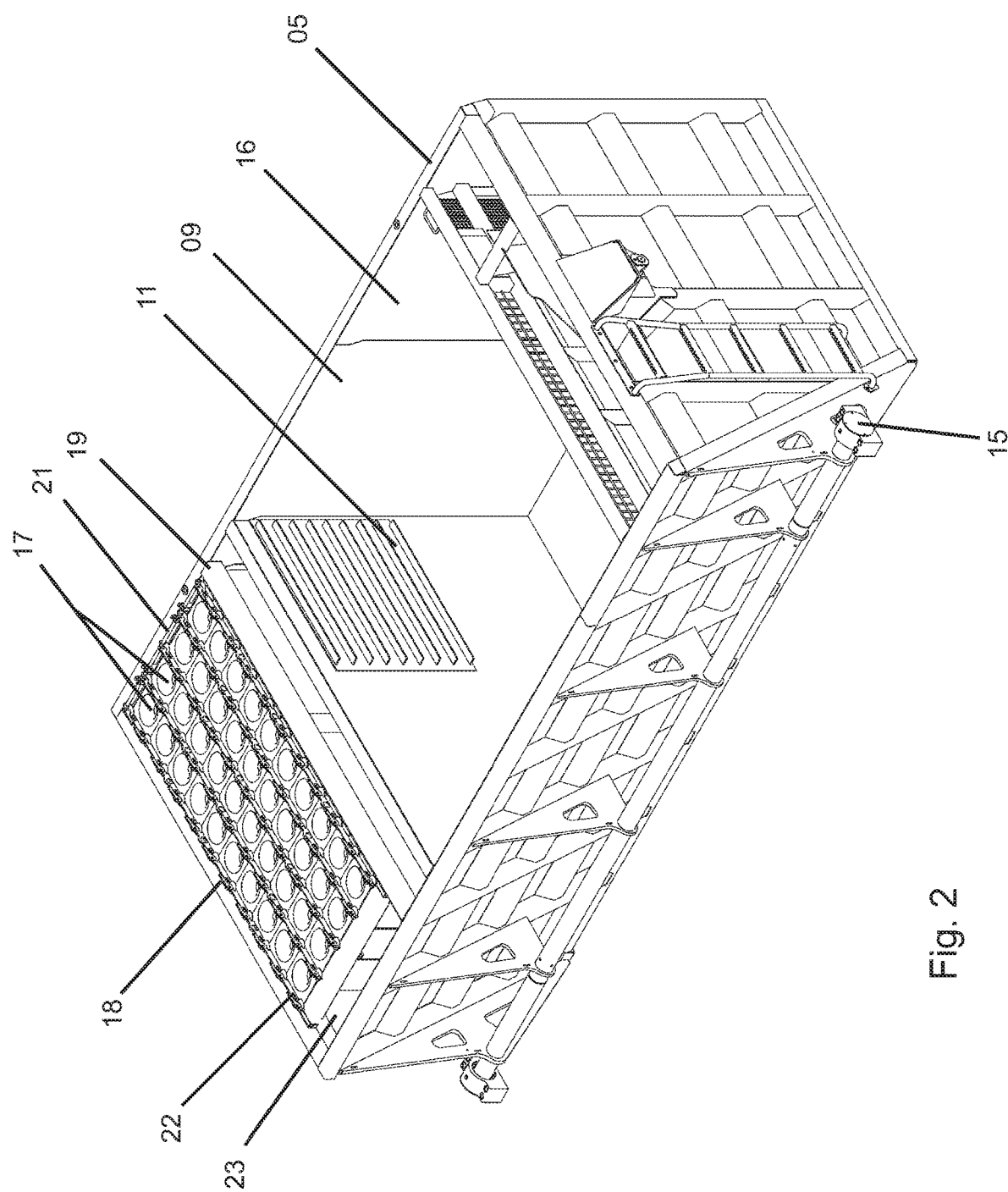
FIG. 2 shows the material collection container in a perspective view in the working position.

FIG. 1 shows a simplified perspective view of a suction excavator 01, which first of all typically includes a vehicle chassis 02 and multiple vehicle wheels 03. In addition, the suction excavator includes a material collection container 05 which is mounted on the vehicle chassis 02. A vehicle longitudinal axis 04 is depicted for purposes of orientation. In addition, the suction excavator 01 includes a material collection container 05 which is mounted on the vehicle chassis 02, and which in FIG. 1 is illustrated swiveled into an emptying position. In contrast, FIG. 2 shows a detail of the material collection container 05 in a working position.

Provided on the rear side of the vehicle is a suction connection 06, to which a suction hose 07 is connected. Material is suctioned in at the free end of the suction hose 07 by means of a suction flow, which is generated by a suction fan 08.

In the embodiment illustrated in FIG. 1, the suction flow is initially diverted into a collection chamber 09. The suction flow then passes through a partition wall 11 and into a filter unit 12, in which smaller particles still present in the suction flow are filtered out. In the illustrated embodiment, the collection chamber 09 is situated behind the filter unit 12 in the travel direction.

The material collection container 05 on its top side is closed by a cover 13, which is shown in the open position in FIG. 1. For this purpose, the material collection container is swiveled upwardly about a folding axis 14, illustrated here on the right side of the vehicle in the travel direction. In the closed position, the cover 13 also closes off the filter chamber on its top side, so that the suction air flow can pass only through the filter unit, and from there through the corresponding air duct channels to an outlet.

The material collection container 05 is swivelable about a tilt axis 15 (FIG. 2) to allow it to be swiveled from the working position (FIG. 2) into the emptying position (FIG. 1). In the emptying position, a collection chamber opening 16 points downwardly so that the suctioned material can automatically exit.

In the illustrated case, the tilt axis 15 extends at the lower left edge of the material collection container 05 so that the material collection container may be dumped toward the left side of the vehicle. The side wall of the material collection container extends downwardly on the side of the tilt axis 15 in a wedge shape, so that in the lower area of the material collection container, space is created for the tilt axis, as the result of which the tilt axis does not protrude, or at best protrudes only minimally, beyond the maximum dimensions of the material collection container.

The filter unit 12 as a filter element includes numerous filter cartridges 17 which are fastened to a retaining plate 18 in the form of a matrix. In the working position, the filter unit 12 thus formed is situated completely in a filter chamber 19, which is a component of the material collection container 05. During the suction operation, the filter unit 12 is closed on its top side by the cover 13.

The filter unit 12 is rotatably fastened to the retaining plate 18 on a rotational axis 21. The rotational axis 21 extends at the upper right edge of the material collection container 05, and thus parallel to the tilt axis 15 but at a radial distance therefrom. The rotational axis 21 is situated diametrically opposite from the tilt axis 15 in relation to the material collection container. In the working position, the retaining plate 18 rests in a frame on the top side of the filter chamber; a rubber seal or the like may be provided at that location for sealing.

The filter unit 12 may be swiveled out of the filter chamber 19 for cleaning or service. For this purpose, initially a locking element 22, which, for example, includes multiple screws and fixes the filter unit in the filter chamber, must be unlocked. When the material collection container 05 is subsequently swiveled out of the working position into the emptying position, tilting by more than 90° automatically results in the torque exerted by the weight of the filter unit 12 bringing about swiveling of the filter unit about the rotational axis 21, so that the filter unit is swiveled out of the filter chamber. This swiveled-out state of the filter unit 12 is apparent in FIG. 1. The further the material collection container is tipped beyond a swivel angle of 90°, the more the filter unit swivels out by gravity. Alternatively, an additional drive may be provided to assist with the swiveling out of the filter unit. A clearance 23 is provided so that the filter cartridges 17 do not collide with the wall of the filter chamber 19 during swiveling out.

The invention claimed is:

1. A suction excavator having:
   a vehicle chassis;
   a suction fan that generates a suction flow;
   a dumpable material collection container that has a collection chamber and is swivelable about a tilt axis that extends parallel to the vehicle longitudinal axis, between a working position and an emptying position, in which a collection chamber opening is in a lower position in order to evacuate by gravity the material contained in the collection chamber;
   a filter unit that is rotatably mounted on a rotational axis that extends parallel to the tilt axis of the material collection container, and that is situated in a filter chamber in the material collection container, behind the collection chamber in the suction flow direction, and contains at least one filter element through which the suction flow passes;
   at least one locking element is provided, which in the locked state fixes the position of the filter unit in the filter chamber and blocks rotation about the rotational axis, while in the unlocked state, swiveling of the filter unit about the rotational axis is enabled in order to swivel the filter unit out of the filter chamber, at least in sections, and the center of gravity of the filter unit is situated in relation to the rotational axis in such a way that the filter unit, at least in sections, swivels out of the filter chamber by gravity during the transition from the working position into the emptying position, and with the locking element unlocked.

2. The suction excavator according to claim 1, the rotational axis is diametrically opposite from the tilt axis in relation to a vehicle center plane.

3. The suction excavator according to claim 1, wherein the filter unit has a retaining plate to which multiple filter elements are fastened, and the retaining plate on one of its side edges is supported on the rotational axis.

4. The suction excavator according to claim 1, wherein a cover is present which closes the material collection container on its top side in the working position, and is supported so as to be swivelable on a folding axis in order to release the top side of the material collection container during the transition into the emptying position.

5. The suction excavator according to claim 4, wherein air duct sections for conducting the suction flow from the filter unit to the suction fan are situated in the cover.

6. The suction excavator according to claim 1, wherein the material collection container is swivelable by more than 90° about the tilt axis in order to reach the emptying position from the working position.

7. The suction excavator according to claim 1, wherein the filter element is formed by multiple cylindrical filter cartridges made of filter material.

8. The suction excavator according to claim 7, wherein the filter cartridges are detachably fastened in the retaining plate by means of quick-acting closures.

9. The suction excavator according to claim 7, wherein a clearance remains between the filter cartridges, which are positioned the farthest distance from the rotational axis, and the wall of the filter chamber, which is situated the farthest distance from the rotational axis, and the clearance allows the filter unit to swivel out without a collision between these filter cartridges and this wall.

10. The suction excavator according to claim 1, wherein a slew drive is provided, which upon activation additionally acts on the filter unit in order to assist with the swiveling out from the filter chamber.

\* \* \* \* \*